US009735834B2

(12) United States Patent
Hillan et al.

(10) Patent No.: US 9,735,834 B2
(45) Date of Patent: *Aug. 15, 2017

(54) METHODS AND APPARATUS FOR IMPROVING NFC ACTIVATION AND DATA EXCHANGE REPORTING MECHANISMS

(71) Applicant: QUALCOMM Incorporated, San Diego, CA (US)

(72) Inventors: John Hillan, Farnborough (GB); Jeremy Robin Christopher O'Donoghue, Farnborough (GB)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/597,778

(22) Filed: Jan. 15, 2015

(65) Prior Publication Data

US 2015/0133050 A1   May 14, 2015

Related U.S. Application Data

(63) Continuation of application No. 13/482,275, filed on May 29, 2012, now Pat. No. 8,971,800.

(Continued)

(51) Int. Cl.
*H04B 5/00* (2006.01)
*H04B 5/02* (2006.01)
*G06K 7/10* (2006.01)

(52) U.S. Cl.
CPC ....... *H04B 5/0031* (2013.01); *G06K 7/10247* (2013.01); *H04B 5/02* (2013.01)

(58) Field of Classification Search
CPC ....... H04W 4/008; H04B 5/02; H04B 5/0012; H04B 5/0018; H04B 5/0031; H04B 5/0081; H04B 13/005; G06K 7/1047
See application file for complete search history.

(56) References Cited

U.S. PATENT DOCUMENTS 6,954,446 B2   10/2005   Kuffner
7,219,145 B2    5/2007   Chmaytelli et al.
(Continued)

FOREIGN PATENT DOCUMENTS

EP   1026627 A1   8/2000
EP   1898313 A1   3/2008
(Continued)

OTHER PUBLICATIONS

"Information technology Telecommunications and information exchange between systems Near Field Communication Interface and Protocol (NFCIP-1)", Technologies de l'information Telecommunications et e'change d'information entire systemes Communication de champ proche Interface et 37-42, protocole (NFCIP-1), International Standard ISO/IEC, XX, XX, vol. 18092, No. 1st edition, Apr. 1, 2004 (Apr. 1, 2004), p. 66PP, XP007905654, p. 6-p. 12, p. 34-p. 36.

(Continued)

*Primary Examiner* — Thanh Le
(74) *Attorney, Agent, or Firm* — Joseph S. Hanasz

(57) ABSTRACT

Aspects relate to improving reporting NFC RF technology usage in activation and data exchange for NFC devices. For example, with a near field communication (NFC) device, a NFCC may be configured to obtain a first radio frequency (RF) technology and mode value, a second RF technology and mode value, and one or more RF specific parameters associated with a NFC device during an activation phase of a communication link using a first NFC RF technology. The one or more RF specific parameters may be based on the first RF technology and mode value. Further, the NFCC may be configured to configure communications to be supported by a second NFC RF technology for use during a data exchange phase of the communication link. The second NFC RF (Continued)

technology may be based on the second RF technology and mode value.

48 Claims, 6 Drawing Sheets

Related U.S. Application Data

(60) Provisional application No. 61/491,788, filed on May 31, 2011.

(56) References Cited

U.S. PATENT DOCUMENTS

| | | | |
|---|---|---|---|
| 7,590,384 | B2 | 9/2009 | Dawidowsky |
| 2003/0074379 | A1 | 4/2003 | Keohane et al. |
| 2005/0077356 | A1 | 4/2005 | Takayama et al. |
| 2007/0078951 | A1 | 4/2007 | Murai et al. |
| 2010/0079261 | A1 | 4/2010 | Goto et al. |
| 2010/0130126 | A1 | 5/2010 | Takayama |
| 2010/0311326 | A1* | 12/2010 | Klabunde ............ H04B 5/0012 455/41.1 |
| 2011/0205944 | A1 | 8/2011 | Miyabayashi et al. |
| 2011/0275316 | A1 | 11/2011 | Suumaeki et al. |
| 2012/0108169 | A1 | 5/2012 | Degauque et al. |
| 2012/0289161 | A1 | 11/2012 | Caruana |
| 2012/0309303 | A1 | 12/2012 | Hillan et al. |
| 2013/0102247 | A1 | 4/2013 | Hillan et al. |
| 2013/0260684 | A1 | 10/2013 | Suzuki et al. |

FOREIGN PATENT DOCUMENTS

| | | |
|---|---|---|
| EP | 2063380 A2 | 5/2009 |
| EP | 2192810 A2 | 6/2010 |
| EP | 2221978 A2 | 8/2010 |
| JP | 2005021817 A | 1/2005 |
| JP | 2005218127 A | 8/2005 |
| JP | 2010118773 A | 5/2010 |
| JP | 2010130311 A | 6/2010 |
| RU | 2280332 C2 | 7/2006 |
| WO | 0006273 A2 | 2/2000 |
| WO | 0241571 A2 | 5/2002 |
| WO | WO-02097618 | 12/2002 |
| WO | 2005104386 A1 | 11/2005 |
| WO | 2006031547 A2 | 3/2006 |

OTHER PUBLICATIONS

International Search Report and Written Opinion—PCT/US2012/040293—ISA/EPO—Nov. 28, 2012.
"Near Field Communication—Interface and Protocol (NFCIP-1)", Standard ECMA—340, 3rd Edition, Jun. 2013.

* cited by examiner

METHODS AND APPARATUS FOR IMPROVING NFC ACTIVATION AND DATA EXCHANGE REPORTING MECHANISMS

CLAIM OF PRIORITY

The present Application is a continuation of application Ser. No. 13/482,275 entitled "METHODS AND APPARATUS FOR IMPROVING NFC ACTIVATION AND DATA EXCHANGE REPORTING MECHANISMS" filed May 29, 2012, which claims priority to Provisional Application No. 61/491,788 entitled "METHODS AND APPARATUS FOR IMPROVING NFC ACTIVATION MECHANISMS" filed May 31, 2011, and both applications are assigned to the assignee hereof and hereby expressly incorporated by reference herein.

BACKGROUND

Field

The disclosed aspects relate generally to communications between devices and specifically to methods and systems for improving mechanisms for reporting activation in near field communication (NFC) devices.

Background

Advances in technology have resulted in smaller and more powerful personal computing devices. For example, there currently exist a variety of portable personal computing devices, including wireless computing devices, such as portable wireless telephones, personal digital assistants (PDAs) and paging devices that are each small, lightweight, and can be easily carried by users. More specifically, the portable wireless telephones, for example, further include cellular telephones that communicate voice and data packets over wireless networks. Many such cellular telephones are manufactured with ever increasing computing capabilities, and as such, are becoming tantamount to small personal computers and hand-held PDAs. Further, such devices are enabling communications using a variety of frequencies and applicable coverage areas, such as cellular communications, wireless local area network (WLAN) communications, NFC, etc.

A NFC enabled device may initially detect a remote NFC device (e.g., a NFC tag, target device, etc.). Thereafter, a notification may be generated within the NFC enabled device to provide information associated with the remote NFC device. An example notification (e.g., a RF_ACTIVATE_NTF message) is provided with reference to Table 1. Note the tables referred to in Table 1 correspond to tables described in a NFC standard (not included).

TABLE 1

Example NFC notification RF_ACTIVATE_NTF

| Payload Field(s) | Length | Value/Description |
|---|---|---|
| Target Handle | 1 Byte | |
| RF Protocol | 1 Byte | See Table 86. |
| NFC RF technology and Mode | 1 Byte | NFC RF technology and Mode of the local device. See Table 50. |
| NFC RF technology Specific Parameters | 0-n Bytes | Depends on NFC RF technology and Mode. See Table 51 for NFC-A Poll Mode. See Table 52 for NFC-A Listen Mode. See Table 53 for NFC-B Poll Mode. See Table 54 for NFC-B Listen Mode. See Table 55 for NFC-F Poll Mode. See Table 56 for NFC-F Listen Mode. |
| RF Interface Type | 1 Byte | See Table 87. |
| Activation Parameters | 0-n Bytes | Activation Parameters are defined on the RF Interface section identified by the RF Interface Type. |

As is evident from Table 1, the notification contains information, such as the "NFC RF technology and Mode" and the "NFC RF technology Specific Parameters." Once sufficient information has been gathered, the notification may be generated and sent along with the information about which NFC RF technology (e.g., NFC-A, NFC-B, NFC-F, etc.) used to gather the information. Currently, there is no means by which to include information in the notification that the bit rate and/or NFC RF technology to be used for data exchange is different from that used in information gathering. A Table 1 based notification may require a device to assume about what happened during activation will remain in place during data exchange. As one example, information gathering may occur using NFC-A at 106 kbit/s, but data exchange may switch to NFC-F at 212 or 424 kbit/s. The notification, as depicted in Table 1 does not provide for a way to report a NFC RF technology change, or the actual bit rates that may be chosen for a subsequent data exchange.

Thus, improved apparatuses and methods providing mechanisms for reporting NFC RF technology usage in activation and data exchange for a NFC device may be desired.

SUMMARY

The following presents a summary of one or more aspects to provide a basic understanding of such aspects. This summary is not an extensive overview of all contemplated aspects, and is not intended to identify key or critical elements of all aspects nor delineate the scope of any or all aspects. Its purpose is to present some concepts of one or more aspects form as a prelude to the more detailed description presented later.

Various aspects are described in connection with improving mechanisms for reporting NFC RF technology usage in activation and data exchange for a NFC device. In one example, with a NFC device a NFCC may be configured to obtain a first radio frequency (RF) technology and mode value, a second RF technology and mode value, and one or more RF specific parameters associated with a remote near field communication (NFC) device during an activation phase of a communication link using a first NFC RF technology. In an aspect, the one or more RF specific parameters and the first NFC RF technology may be based on the first RF technology and mode value. The NFCC may be further configured to configure communications to be supported by a second NFC RF technology for use during a data exchange phase of the communication link. In an aspect, the second NFC RF technology may be based on the second RF technology and mode value.

According to related aspects, a method provides a mechanism for reporting NFC RF technology usage in activation and data exchange for a NFC device. The method can include obtaining a first radio frequency (RF) technology and mode value, a second RF technology and mode value, and one or more RF specific parameters associated with a remote near field communication (NFC) device during an activation phase of a communication link using a first NFC RF technology. In an aspect, the one or more RF specific parameters and the first NFC RF technology may be based on the first RF technology and mode value. Moreover, the method can include configuring communications to be supported by a second NFC RF technology for use during a data exchange phase of the communication link. In an aspect, the second NFC RF technology may be based on the second RF technology and mode value.

Another aspect relates to a communications apparatus. The wireless communications apparatus can include means for obtaining a first radio frequency (RF) technology and mode value, a second RF technology and mode value, and one or more RF specific parameters associated with a remote near field communication (NFC) device during an activation phase of a communication link using a first NFC RF technology. In an aspect, the one or more RF specific parameters and the first NFC RF technology may be based on the first RF technology and mode value. Moreover, the communications apparatus can include means for configuring communications to be supported by a second NFC RF technology for use during a data exchange phase of the communication link. In an aspect, the second NFC RF technology may be based on the second RF technology and mode value.

Another aspect relates to a communications apparatus. The apparatus can include a NFC controller (NFCC) configured to obtain a first radio frequency (RF) technology and mode value, a second RF technology and mode value, and one or more RF specific parameters associated with a remote near field communication (NFC) device during an activation phase of a communication link using a first NFC RF technology. In an aspect, the one or more RF specific parameters and the first NFC RF technology may be based on the first RF technology and mode value. The NFCC may also be configured to configure communications to be supported by a second NFC RF technology for use during a data exchange phase of the communication link. In an aspect, the second NFC RF technology may be based on the second RF technology and mode value.

Another aspect relates to a computer program product, which can have a computer-readable medium comprising code for obtaining a first radio frequency (RF) technology and mode value, a second RF technology and mode value, and one or more RF specific parameters associated with a remote near field communication (NFC) device during an activation phase of a communication link using a first NFC RF technology. In an aspect, the one or more RF specific parameters and the first NFC RF technology may be based on the first RF technology and mode value. The computer-readable medium can also include code for configuring communications to be supported by a second NFC RF technology for use during a data exchange phase of the communication link. In an aspect, the second NFC RF technology may be based on the second RF technology and mode value.

To the accomplishment of the foregoing and related ends, the one or more aspects comprise features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth to provide a thorough understanding of one or more aspects. It should be understood, however, that such aspect(s) may be practiced without these specific details.

Generally, a device may recognize a NFC target device and/or tag when within range of the coverage area of the NFC device, reader/writer, card, and/or tag. Thereafter, the NFC device may obtain sufficient information to allow for communications to be established. As described herein, communications between NFC devices may be enabled over a variety of NFC technologies, such as but not limited to, NFC-A, NFC-B, NFC-F, etc. Further, different NFC technologies may be enabled during different phases of communications (e.g., an activation phase, a data exchange phase, etc.)

The words "wireless power" is used herein to mean any form of energy associated with electric fields, magnetic fields, electromagnetic fields, or otherwise that is transmitted between from a transmitter to a receiver without the use of physical electromagnetic conductors.

Figure 1:
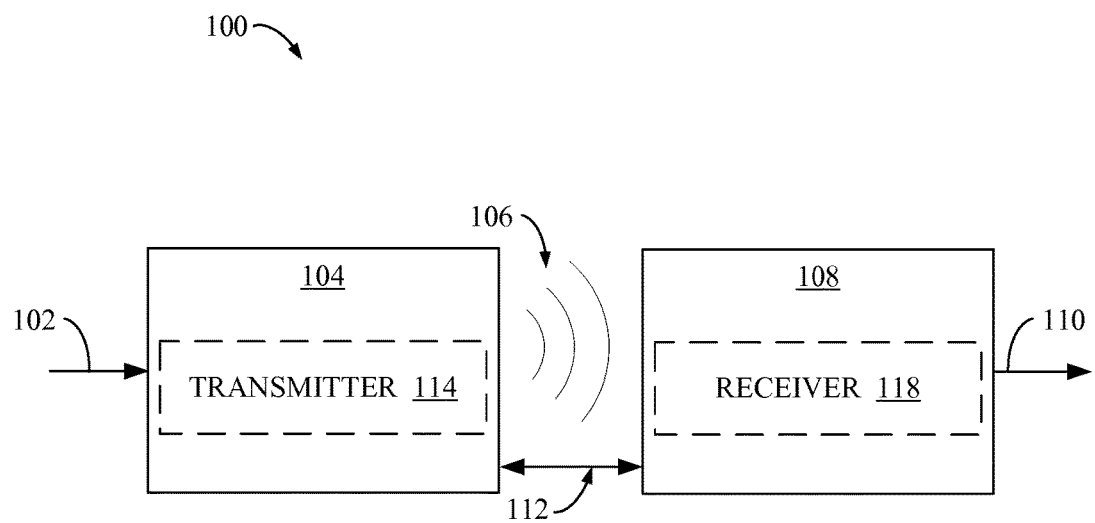
FIG. 1 is a block diagram of a wireless communication system according to an aspect.

FIG. 1 illustrates a wireless transmission or charging system 100, in accordance with various exemplary embodiments of the present invention. Input power 102 is provided to a transmitter 104 for generating a radiated field 106 for providing energy transfer. A receiver 108 couples to the radiated field 106 and generates an output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship and when the resonant frequency of receiver 108 and the resonant frequency of transmitter 104 are very close, transmission losses between the transmitter 104 and the receiver 108 are minimal when the receiver 108 is located in the "near-field" of the radiated field 106.

Transmitter 104 further includes a transmit antenna 114 for providing a means for energy transmission. A receiver 108 includes a receive antenna 118 as a means for energy reception. The transmit and receive antennas are sized according to applications and devices associated therewith. As stated, an efficient energy transfer occurs by coupling a large portion of the energy in the near-field of the transmitting antenna to a receiving antenna rather than propagating most of the energy in an electromagnetic wave to the far field. When in this near-field a coupling mode may be developed between the transmit antenna 114 and the receive antenna 118. The area around the antennas 114 and 118 where this near-field coupling may occur is referred to herein as a coupling-mode region.

Figure 2:
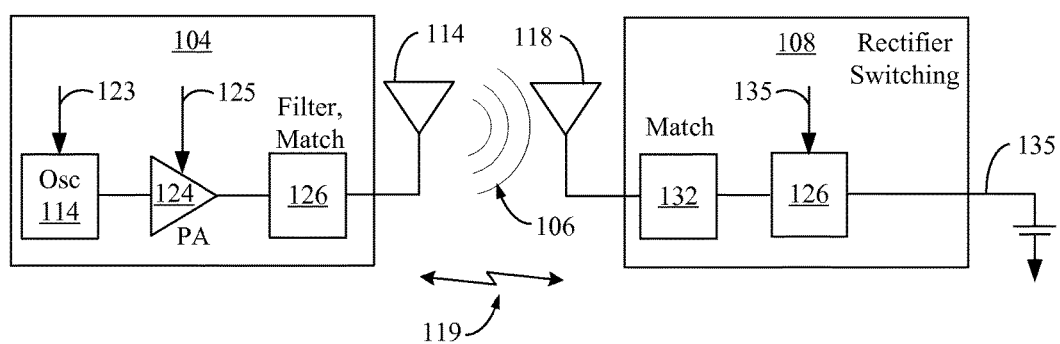
FIG. 2 is a schematic diagram of a wireless communication system, according to an aspect.

FIG. 2 is a schematic diagram of an example near field wireless communication system. The transmitter 204 includes an oscillator 222, a power amplifier 224 and a filter and matching circuit 226. The oscillator is configured to generate a signal at a desired frequency, which may be adjusted in response to adjustment signal 223. The oscillator signal may be amplified by the power amplifier 224 with an amplification amount responsive to control signal 225. The filter and matching circuit 226 may be included to filter out harmonics or other unwanted frequencies and match the impedance of the transmitter 204 to the transmit antenna 214.

The receiver 108 may include a matching circuit 132 and a rectifier and switching circuit 134 to generate a DC power output to charge a battery 136 as shown in FIG. 2 or power a device coupled to the receiver (not shown). The matching circuit 132 may be included to match the impedance of the receiver 108 to the receive antenna 118. The receiver 108 and transmitter 104 may communicate on a separate communication channel 119 (e.g., Bluetooth, zigbee, cellular, etc).

Figure 3:
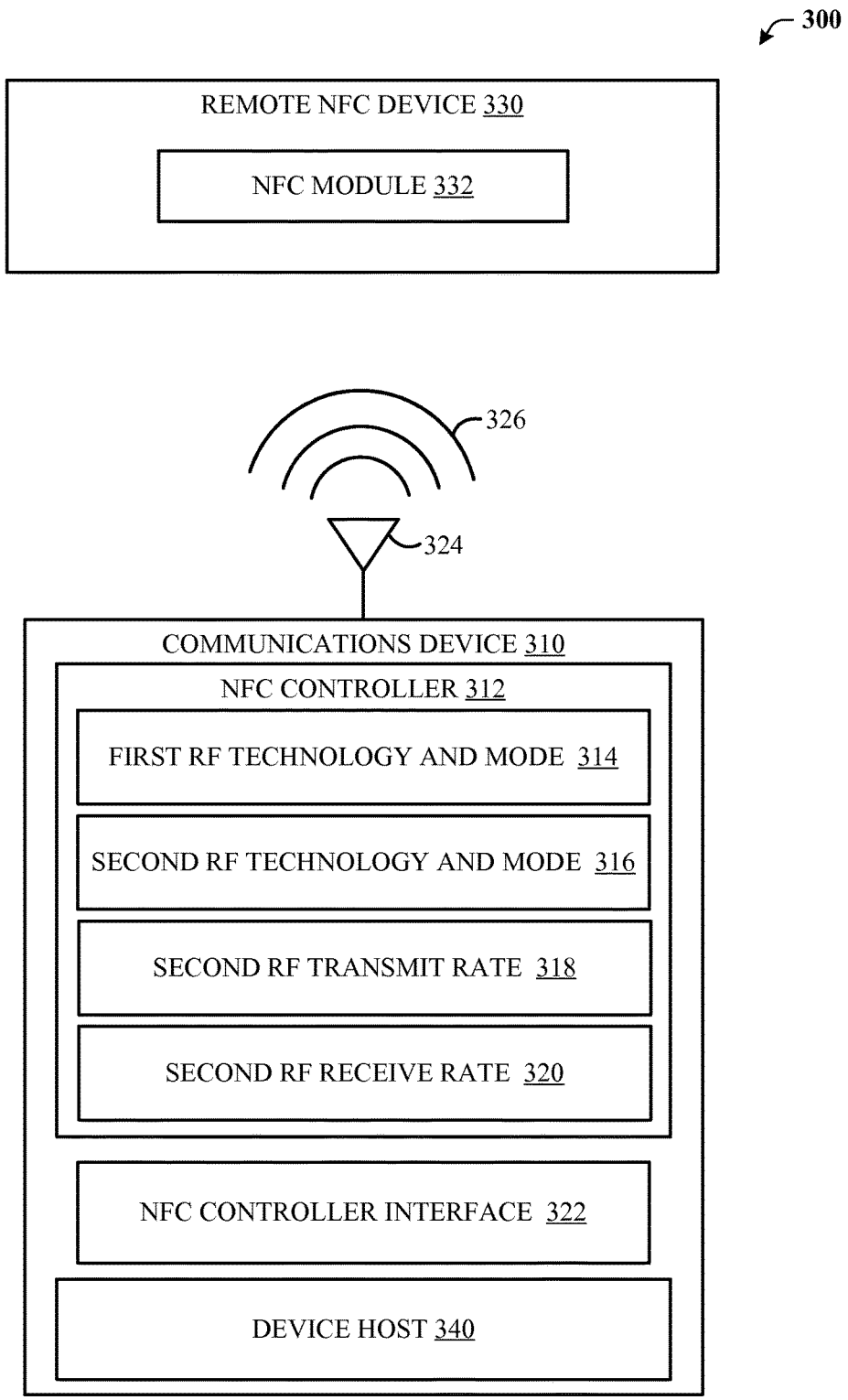
FIG. 3 is a block diagram of a NFC environment, according to an aspect.

With reference to FIG. 3, a block diagram of a communication network 300 according to an aspect is illustrated. Communication network 300 may include communications devices 310 which, through antenna 324, may be in communication with a remote NFC device 330 using one or more NFC technologies 326 (e.g., NFC-A, NFC-B, NFC-F, etc.). In another aspect, communications device 310 may be configured to be connected to an access network and/or core network (e.g., a CDMA network, a GPRS network, a UMTS network, and other types of wireline and wireless communication networks).

In an aspect, communications device 310 may include a NFC controller 312, a NFC controller interface (NCI) 322, and a device host 340. In an aspect, device host 340 may be configured to obtain, through NCI 322, and NFC Controller 312 information from remote NFC endpoint 330 through NFC module 332 associated with remote NFC endpoint 330.

As part of establishing a communication link, NFC Controller 312 may obtain information from remote NFC device 330 through NCI 322. Such information may include a first RF technology and mode value 314, a second RF technology and mode value 316, a data transmit rate associated with the second NFC RF technology 318, and a data receive rate associated with the second NFC RF technology 320. Further, in an aspect, NFC controller 312 may be configured to aggregate the obtained NFC information into a notification (e.g., a RF_ACTIVATE_NTF message). By way of example and not in limitation, Table 2 provides a notification message that NFC controller 312 may generate. Differences between Table 1 and Table 2 are indicated using bold font in Table 2.

TABLE 2

Example notification Message RF_ACTIVATE_NTF

| Payload Field(s) | Length | Value/Description |
|---|---|---|
| Target Handle | 1 Byte | |
| RF Protocol | 1 Byte | See Table 86. |
| Activation NFC RF technology and Mode | 1 Byte | NFC RF technology and Mode of the local device that were used for the collection of the NFC RF technology Specific Parameters below. See Table 50. |
| NFC RF technology Specific Parameters | 0-n Bytes | Depends on NFC RF technology and Mode. See Table 51 for NFC-A Poll Mode. See Table 52 for NFC-A Listen Mode. See Table 53 for NFC-B Poll Mode. See Table 54 for NFC-B Listen Mode. See Table 55 for NFC-F Poll Mode. See Table 56 for NFC-F Listen Mode. |
| Data Exchange NFC RF technology and Mode | 1 Byte | NFC RF technology that will be used for future Data Exchange. See Table 50. |
| Data Exchange Transmit Bit Rate | 1 Byte | Bit Rate that will be used for future Data Exchange in the poll->listener direction. |
| Data Exchange Receive Bit Rate | 1 Byte | Bit Rate that will be used for future Data Exchange in the listener->poll direction. |
| RF Interface Type | 1 Byte | See Table 87. |
| Activation Parameters | 0-n Bytes | Activation Parameters are defined on the RF Interface section identified by the RF Interface Type. |

As used herein, a poll mode may be defined as a mode during which the communications device 310 is transmitting and a listener mode may be defined as a mode during which the communications device 310 is available to receive communications. As noted above, the tables referred to in Table 2 correspond to tables described in a NFC standard (not included).

Referring to Table 2 in comparison to Table 1, the additional parameters included in the notification allow information to be reported about the values that have been selected for use after activation. As such, the notification may be extended to include both information gathered during activation, and parameters negotiated for use following activation (e.g., during data exchange). Further, depending on a selected Target Handle/RF Protocol, the NFC controller 312 may performs protocol activation procedures before activating an RF Interface. Protocol activation may be different for each RF Interface. Generally, the Target Handle value communicated in an RF_ACTIVATE_NTF is valid until the state is changed to an idle state (e.g., RFST_IDLE).

When all phases before RF Interface activation are performed successfully, NFC controller 312 may send a notification (e.g., RF_ACTIVATE_NTF) with information about the activated RF Interface (RF Interface Type) to device host 340. NFC controller 312 may also include activation parameters in the notification. Activation parameters may be different for each RF Interface while other parameters in a RF_ACTIVATE_NTF may be the same as those used in a RF_DISCOVER_NTF message. NFC controller 312 may include the NFC RF technology and Mode that was used during the activation process (e.g., Activation NFC RF technology and Mode) in the notification. NFC controller 312 also includes any NFC RF technology Specific Parameters that may have been gathered during the activation process. These included parameters may be defined for the RF technology and mode value that was used during the activation process. If the RF Protocol is PROTOCOL_N-

FC_DEP or PROTOCOL_ISO_DEP the NFC controller 312 may include the bit rates for poll to listen and listen to poll that were established during activation, and the bit rates for poll to listen and listen to poll that may be used for subsequent data exchange. If the RF Protocol is other than PROTOCOL_NFC_DEP or PROTOCOL_ISO_DEP, the NFC controller 312 may include the bit rates for poll to listen and listen to poll that may be used for subsequent data exchange.

In an aspect, by explicitly including information, such as the first RF technology and mode value 314 and the second RF technology and mode value 316 in a notification, NFC controller 312 also supports the possibility of providing information related to a change from a passive communication link (e.g., ISO 18092 Passive communication link) to an active communication link (e.g., ISO 18092 Active communication link). An ISO 18092 Active Communication link may provide better range than an ISO 18092 Passive communication link. Such addition range may be useful for an application and/or module associated with communications device 310 that may receive an activation notification.

In an operational aspect, if the RF Protocol is PROTOCOL_NFC_DEP, the NFC controller 312 may include the NFC RF technology and Mode that was established during activation and the NFC RF technology and Mode that may be used for subsequent data exchange. Note that if the bit rate was changed during activation because of the value specified in BITR_NFC_DEP, the NFC RF technology and Mode may be different from the one that defines the nature of the NFC RF technology Specific Parameters. If the RF Protocol is determined to be something other than PROTOCOL_NFC_DEP, the NFC controller 312 may include a RF technology and mode value that may be used for subsequent data exchange.

NFC controller 312 may provide information to device host 340 for both an activation phase and a data exchange phase. Accordingly, the enhanced notification, such as depicted in Table 2, may resolve ambiguity in data gathered during activation that might not be in sync with conditions experienced by NFC controller 312 during data exchange.

Further, the notification generated by NFC controller 312 may provide information to device host 340 with respect to selected receive and transmit data rates that may be used for subsequent data exchanges. In operation, by way of example and not limitation, information associated with receive and transmit data rates may enable communications device 310 to compute an estimated time value for transferring a given amount of data. In such an aspect, the estimated time value may be used by an application provide a message, e.g., pop-up message, on to communications device 310 in advance of beginning a data transfer. Such a message may prompt the user to determine whether to proceed with data transfer. For example the message may indicate that "The file you've selected to transfer will take about 15 minutes to transfer. Do you want to proceed (Y|N)?" This prompting scheme may improve the user experience, particularly for those unfamiliar with the speeds associated with NFC.

For example, if a first RF technology and mode value indicates communications at 106 kbps, the communications device 310 may use NFC-A, whereas if 424 kbps is used, the communications device 310 may use NFC-F. These values are provided as an example as future releases may allow the use of NFC-A for bit rates other than 106 kbps. In another example, if activation takes place using NFC-A, but data exchange is configured to occur at 212 or 424 kbps, the NFC RF technology used for the data exchange may be NFC-F. Conversely, if activation takes place using NFC-F, but data exchange is configured to occur at 106 kbps, the NFC RF technology used for the data exchange may be NFC-A.

Accordingly, communications system 300 provides an environment in which remote NFC device 330 may communicate information to enable communications device 310 to provide improved mechanisms for a NFC controller 312 to report NFC RF technology usage in activation and data exchange to a device host 340.

Figure 4:
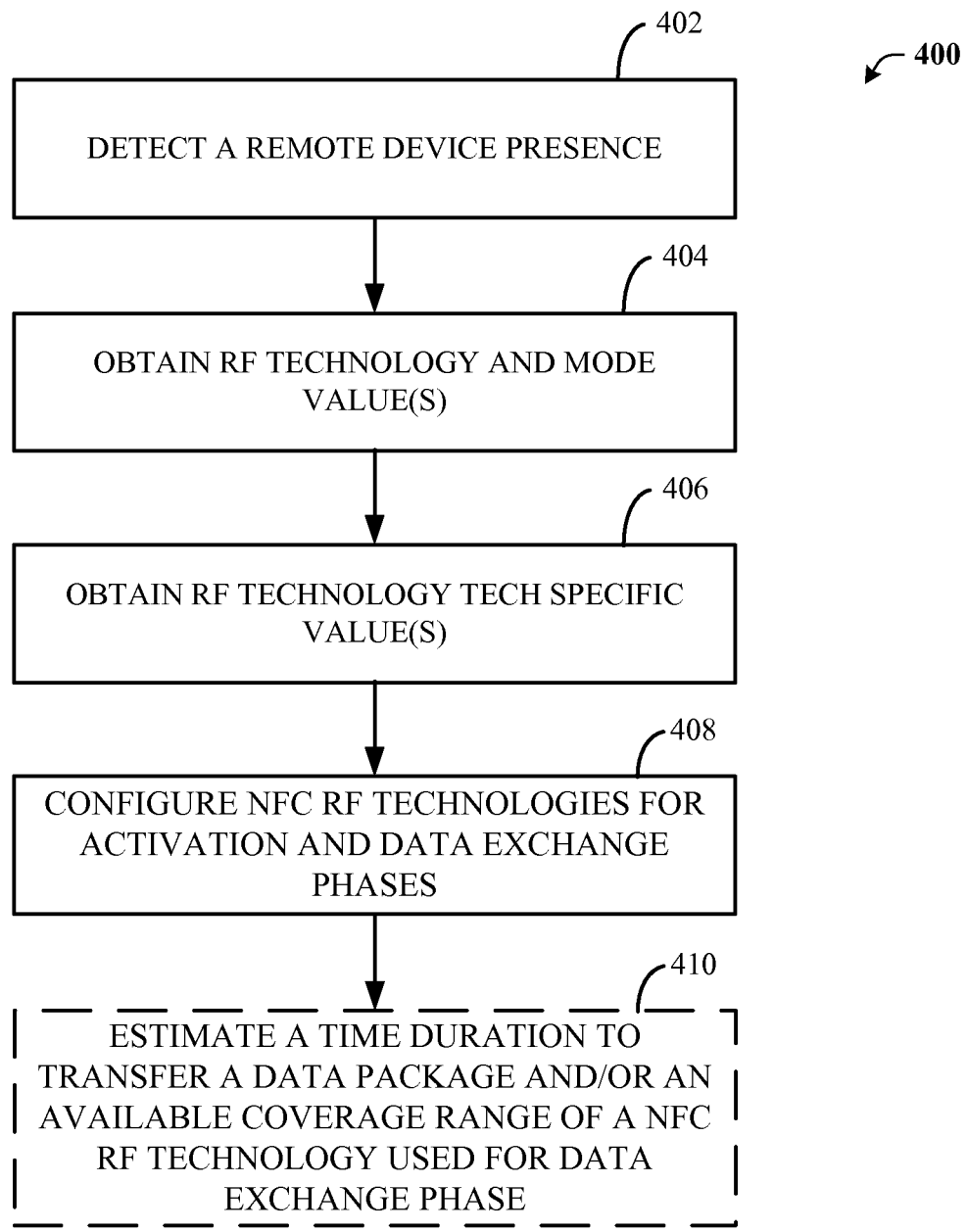
FIG. 4 is a flowchart diagram describing an example for improving mechanisms for reporting NFC RF technology usage in activation and data exchange for a NFC device, according to an aspect.

FIG. 4 illustrates methodologies in accordance with various aspects of the presented subject matter. While the methodologies are shown and described as a series of acts or sequence steps for the purposes of simplicity of explanation, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

With reference now to FIG. 4, a flowchart describing an example process 400 for a NFCC to improve reporting of activation and data exchange parameters in a NFC device is illustrated.

At block 402, the presence of remote NFC device may be detected by a communications device. In an aspect, the remote NFC device may include a NFC tag, a writer device, a reader device, a NFC card, a target peer device, etc. In another aspect, the remote NFC device may be detected using a first NFC RF technology (e.g., an activation mode NFC RF technology).

At block 404, a NFCC associated with the communications device may obtain values associated with a first NFC RF technology. In an aspect, the values associated with the first NFC RF technology may be described with reference to Table 1. In an aspect, the first NFC RF technology may be one of a NFC-A technology, a NFC-B technology, or a NFC-F technology. Further, values associated with a second NFC RF technology may be obtained. In an aspect, the second NFC RF technology is different than the first NFC RF technology. In such an aspect, the first and second RF technologies may be configured to communicate using different data rates. In another aspect, the values associated with the second NFC RF technology may be described with reference to Table 2. In an aspect, the second NFC RF technology may be one of a NFC-A technology, a NFC-B technology, or a NFC-F technology. Further, in another aspect, the second NFC RF technology may be used during a data exchange phase, while the first NFC RF technology may be used during an activation phase.

At block 406, the NFCC may obtain NFC RF technology specific values. For example, data rates to be used during polling modes and listening modes may be obtained for the first and/or second RF technologies.

At block 408, a NFCC may configure a notification message for reporting at least a portion of the obtained values associated with a communications link. In an aspect, the notification message may be formatted as depicted in Table 2. In another aspect, the notification message may be communicated to a device host.

Figure 5:
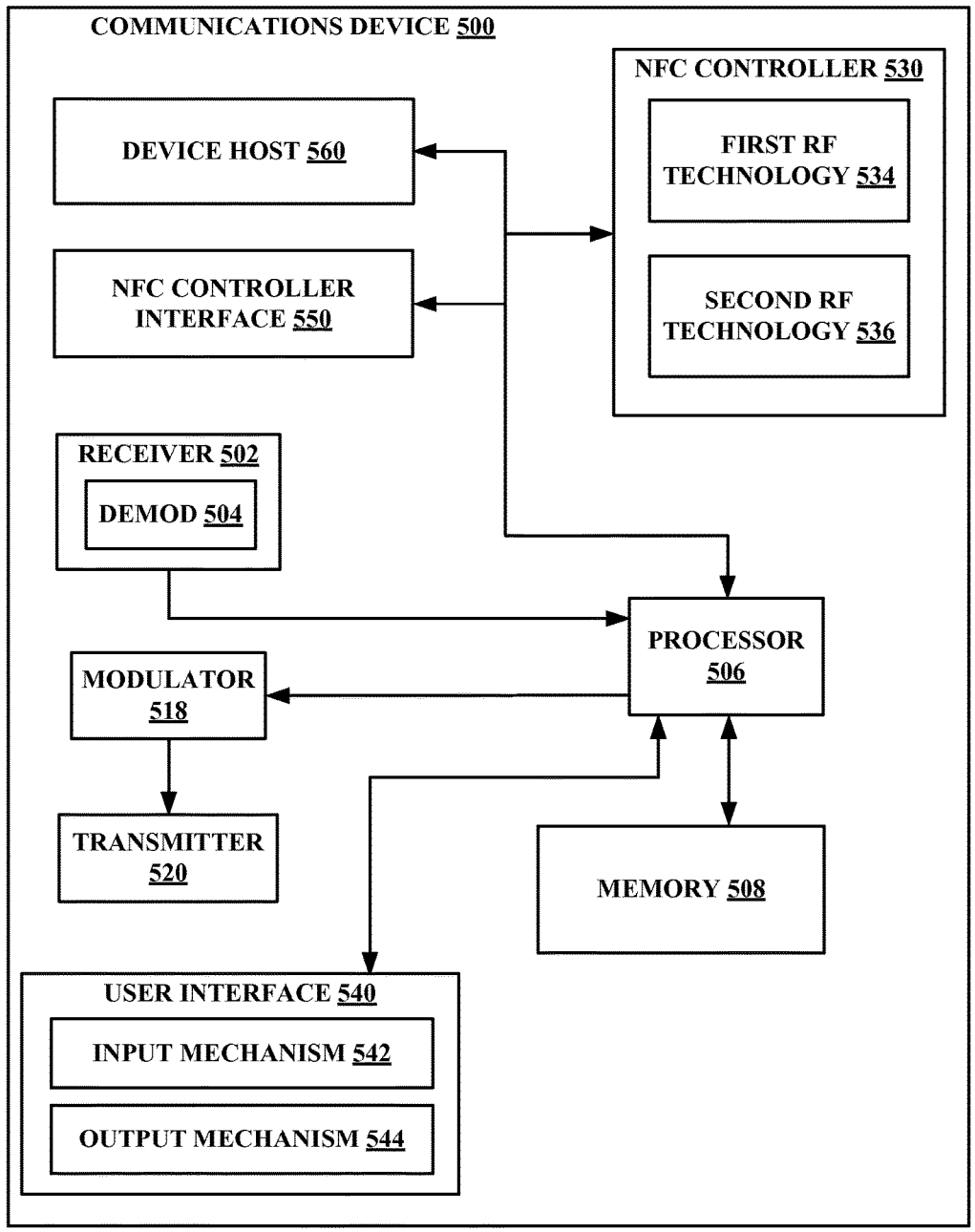
FIG. 5 is a functional block diagram example architecture of a communications device, according to an aspect.

In an optional aspect, at block 410, the communications device may estimate one or more values associated with the communication link. In an aspect, the communications device may estimate a time duration to transfer a data package of a first size based on a data rate associated with the second NFC RF technology. In such an aspect, the communications device may further prompt with an option to proceed with the data package transfer based on the estimated time duration and receive a response from the user indicating whether to proceed with the data package transfer. In another aspect, the communications device may estimate an available coverage range for the second NFC RF technology based on a Passive communication link or an Active communication link in use by the second NFC RF technology. In such an aspect, the communications device may prompt with a notification indicating a potential change in the communication link and a change in the estimated available coverage range associate with the change While referencing FIG. 3, but turning also now to FIG. 5, an example architecture of communications device 510 is illustrated. As depicted in FIG. 5, communications device 500 includes receiver 502 that receives a signal from, for instance, a receive antenna (not shown), performs typical actions on (e.g., filters, amplifies, downconverts, etc.) the received signal, and digitizes the conditioned signal to obtain samples. Receiver 502 can include a demodulator 504 that can demodulate received symbols and provide them to processor 506 for channel estimation. Processor 506 can be a processor dedicated to analyzing information received by receiver 502 and/or generating information for transmission by transmitter 520, a processor that controls one or more components of device 500, and/or a processor that both analyzes information received by receiver 502, generates information for transmission by transmitter 520, and controls one or more components of communications device 500. Further, signals may be prepared for transmission by transmitter 520 through modulator 518 which may modulate the signals processed by processor 506.

Communications device 500 can additionally include memory 508 that is operatively coupled to processor 506 and that can store data to be transmitted, received data, information related to available channels, TCP flows, data associated with analyzed signal and/or interference strength, information related to an assigned channel, power, rate, or the like, and any other suitable information for estimating a channel and communicating via the channel.

Further, at least one of processor 506 or NFC controller 530 can provide means for obtaining a first radio frequency (RF) technology and mode value, a second RF technology and mode value, and one or more RF specific parameters associated with a remote near field communication (NFC) device during an activation phase of a communication link using a first NFC RF technology, and means for configuring communications to be supported by a second NFC RF technology for use during a data exchange phase of the communication link. In an aspect, the one or more RF specific parameters and the first NFC RF technology may be based on the first RF technology and mode value. In an aspect, the second NFC RF technology may be based on the second RF technology and mode value It will be appreciated that data store (e.g., memory 508) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 508 of the subject systems and methods may comprise, without being limited to, these and any other suitable types of memory.

Communications device 500 may include a NFC controller 530. In an aspect, NFC Controller 530 may obtain, through NCI 550, information from other devices, such as remote NFC device 330. Such information may be associated with a first NFC RF technology 534 and/or a second NFC RF technology 536. For example, the information may include a first RF technology and mode value, a second RF technology and mode value, a data transmit rate associated with the second NFC RF technology, and a data receive rate associated with the second NFC RF technology. Further, in an aspect, NFC controller 530 may aggregate the obtained NFC information into a notification (e.g., a RF_ACTIVATE_NTF message). The notification may be communicated to device host 560. As noted above, by way of example and not in limitation, Table 2 provides a notification message that NFC controller 530 may generate.

In another aspect, communications device 500 may include NFC controller interface (NCI) 550. In an aspect, NCI 550 may be configured to enable communications between a NFC enabled antenna (e.g., 502, 520), NFC controller 530 and device host 560.

Additionally, communications device 500 may include user interface 540. User interface 540 may include input mechanisms 542 for generating inputs into communications device 500, and output mechanism 544 for generating information for consumption by the user of the communications device 500. For example, input mechanism 542 may include a mechanism such as a key or keyboard, a mouse, a touch-screen display, a microphone, etc. Further, for example, output mechanism 544 may include a display, an audio speaker, a haptic feedback mechanism, a Personal Area Network (PAN) transceiver etc. In the illustrated aspects, the output mechanism 544 may include a display configured to present media content that is in image or video format or an audio speaker to present media content that is in an audio format. In operation, by way of example and not limitation, information associated with receive and transmit data rates may enable communications device 500 to compute an estimated time value for transferring a given amount of data. In such an aspect, the estimated time value may be used by an application provide a message, e.g., pop-up message, through output mechanism 544 in advance of beginning a data transfer. Such a message may prompt the user to determine whether to proceed with data transfer. For example, the message may indicate that "The file you've selected to transfer will take about 15 minutes to transfer. Do you want to proceed (Y/N)?" The user may be provided with one or more response options using input mechanism 542. This prompting scheme may improve the user experience, particularly for those unfamiliar with the speeds associated with NFC.

Figure 6:
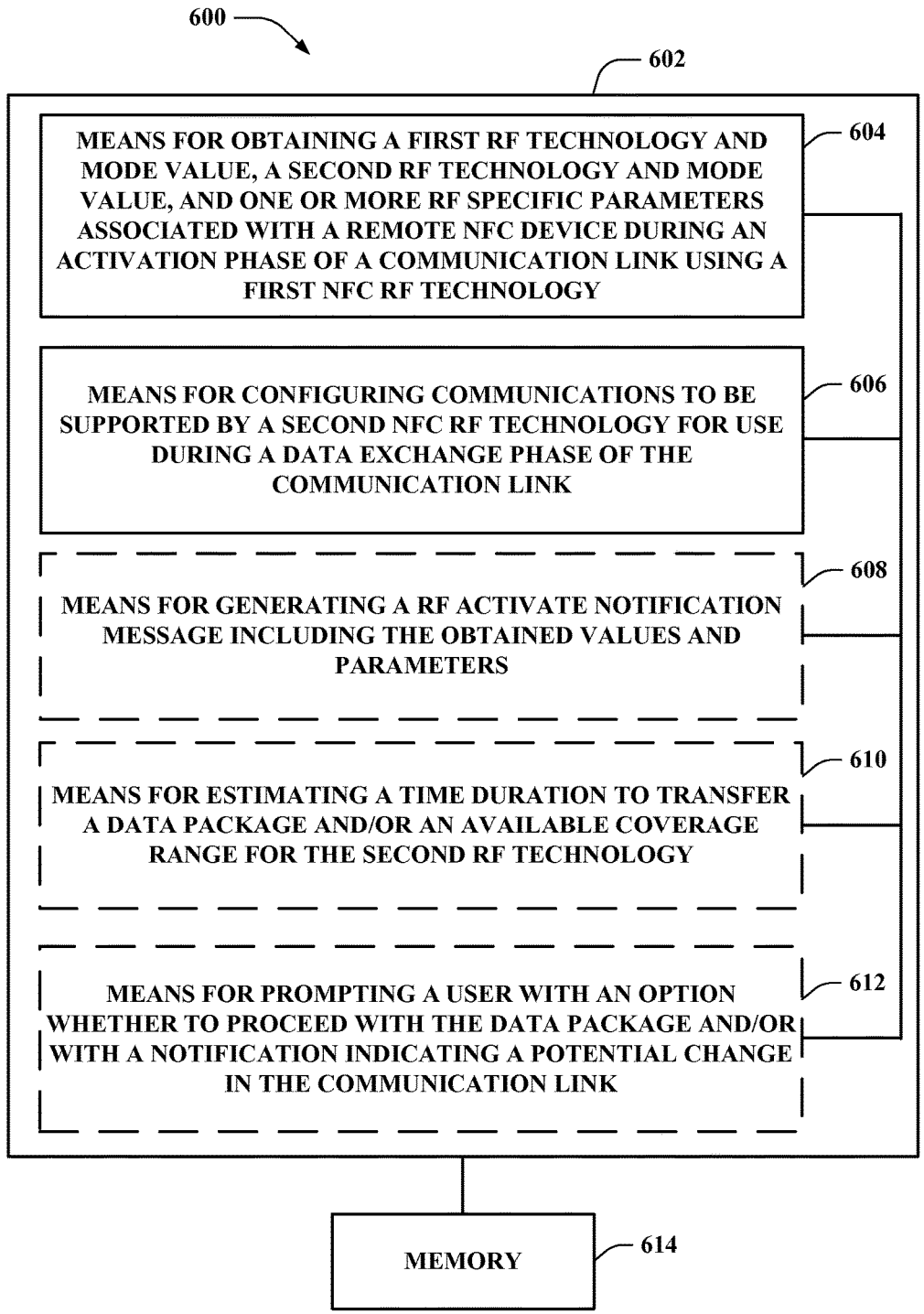
FIG. 6 is a functional block diagram of an example communication system for improving mechanisms for reporting NFC RF technology usage in activation and data exchange for a NFC device, according to an aspect.

FIG. 6 is a block diagram depicting an exemplary communication system 600 configured to provide mechanisms for reporting NFC RF technology usage in activation and data exchange for a NFC device, according to an aspect. For example, system 600 can reside at least partially within a communications device (e.g., communications device 500). It is to be appreciated that system 600 is represented as including functional blocks, which can represent functions implemented by a processor, software, or combination thereof (e.g., firmware). System 600 includes a logical grouping 602 of electrical components that can act in conjunction.

For instance, logical grouping 602 can include an electrical component that may provide means for obtaining a first RF technology and mode value, a second RF technology and mode value, and one or more RF specific parameters associated with a remote NFC) device during an activation phase of a communication link using a first NFC RF technology 604. In an aspect, the RF specific parameters and the first NFC RF technology may be based on the first RF technology and mode value. In an aspect, the remote NFC device may include a remote NFC tag, a reader device, a writer device, a NFC card, a remote peer target device, etc. In an aspect, the first NFC RF technology may be different than the second NFC RF technology. In such an aspect, the second NFC RF technology may support different data rate communications than the first NFC RF technology. In an aspect, each of the first and second RF technologies may include a NFC-A technology, a NFC-B technology, a NFC-F technology, etc. In an aspect, the communication link may be an active communication link or a passive communication link. In another aspect, electrical component 604 may further provide means for obtaining a data exchange phase transmit bit rate, and a data exchange phase receive bit rate. In such an aspect, a data exchange phase transmit bit rate, and a data exchange phase receive bit rate may be associated with the second RF technology and mode value and may be used during the data exchange phase.

Further, logical grouping 602 can include an electrical component that may provide means for configuring communications to be supported by a second NFC RF technology for use during a data exchange phase of the communication link 606. In an aspect, the second NFC RF technology may be based on the second RF technology and mode value. In an aspect, the electrical component 606 may provide means for determining the start of the data exchange phase, and means for enabling the communications supported using the second NFC RF technology.

Further, in an optional aspect logical grouping 602 can include an electrical component that may provide means for generating a RF activate notification message including the obtained values and parameters 608.

Further, in an optional logical grouping 602 can include an electrical component that may provide means for estimating a time duration to transfer a data package and/or an available coverage range for the second NFC RF technology 610. In an aspect, the optional electrical component 610 may provide means for estimating a time duration to transfer a data package of a first size based on a data rate associated with the second NFC RF technology. In another aspect, where the communication link is either a Passive communication link or an Active communication link, the optional electrical component 610 may provide means for estimating an available coverage range for the second NFC RF technology based on the Passive communication link or the Active communication link in use by the second NFC RF technology.

Moreover, in an optional logical grouping 602 can include an electrical component that may provide means for prompting with an option to proceed with the data package and/or with a notification indicating a potential change in the communication link 612. In an aspect, the optional electrical component 612 may provide means for prompting with an option to proceed with the data package transfer based on the estimated time duration, and means for receiving a response from the user indicating whether to proceed with the data package transfer. In Another aspect, the optional electrical component 612 may provide means for prompting with a notification indicating a potential change in the communication link and a change in the estimated available coverage range associate with the change.

Additionally, system 600 can include a memory 614 that retains instructions for executing functions associated with the electrical components 604, 606, 608, 610, and 612, stores data used or obtained by the electrical components 604, 606, 608, 610, 612, etc. While shown as being external to memory 614, it is to be understood that one or more of the electrical components 604, 606, 608, 610, and 612 may exist within memory 614. In an example, electrical components 604, 606, 608, 610, and 612 can include at least one processor, or each electrical component 604, 606, 608, 610, and 612 can be a corresponding module of at least one processor. Moreover, in an additional or alternative example, electrical components 604, 606, 608, 610, and 612 may be a computer program product including a computer readable medium, where each electrical component 604, 606, 608, 610, and 612 may be corresponding code.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, mobile equipment (ME), remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH, near-field communications (NFC-A, NFC-B, NFC-f, etc.), and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules configured to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An example storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or aspects, it should be noted that various changes and modifications could be made herein without departing from the scope of the described aspects and/or aspects as defined by the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

What is claimed is:

1. A method of wireless communications, comprising:
    obtaining a first radio frequency (RF) technology and mode value, a second RF technology and mode value, and one or more RF specific parameters associated with a remote near field communication (NFC) device during an activation phase of a communication link using a first NFC RF technology, wherein the one or more RF specific parameters is based on the first RF technology and mode value; and
    configuring communications to be supported by a second NFC RF technology for use during a data exchange phase of the communication link, wherein the second NFC RF technology is based on the second RF technology and mode value.

2. The method of claim 1, wherein the configuring comprises:
    determining the start of the data exchange phase; and
    enabling the communications supported using the second NFC RF technology.

3. The method of claim 2, wherein the obtaining further comprises obtaining a data exchange phase transmit bit rate and a data exchange phase receive bit rate, and wherein the data exchange phase transmit bit rate and the data exchange phase receive bit rate are associated with the second RF technology and mode value and are used during the data exchange phase.

4. The method of claim 1, wherein the remote NFC device includes one selected from among a remote NFC tag, a reader device, a writer device, a NFC card, and a remote peer target device.

5. The method of claim 1, wherein the second NFC RF technology supports different data rate communications than the first NFC RF technology.

6. The method of claim 1, wherein each of the first and second RF technologies includes one selected from among a NFC-A technology, a NFC-B technology, and a NFC-F technology.

7. The method of claim 1, furthering comprising:
    estimating a time duration to transfer a data package of a first size based on a data rate associated with the second NFC RF technology.

8. The method of claim 7, further comprising:
    prompting a user with an option to proceed with the data package transfer based on the estimated time duration; and
    receiving a response from the user indicating whether to proceed with the data package transfer.

9. The method of claim 1, further comprising generating a RF activate notification message including the obtained values and parameters and sending the RF activate notification message to a device host.

10. The method of claim 1, wherein each of the first and second NFC RF Technologies uses a communication link, wherein the communication link is one link among a Passive communication link and an Active communication link.

11. The method of claim 10, furthering comprising:
    estimating an available coverage range for the second NFC RF technology based on the communication link in use by the second NFC RF technology.

12. The method of claim 11, further comprising:
    prompting with a notification indicating a potential change in the communication link and a change in the estimated available coverage range associate with the change.

13. A non-transitory computer-readable medium storing computer-executable code, comprising:
    code executable to obtain a first radio frequency (RF) technology and mode value, a second RF technology and mode value, and one or more RF specific parameters associated with a remote near field communication (NFC) device during an activation phase of a communication link using a first NFC RF technology, wherein the one or more RF specific parameters is based on the first RF technology and mode value; and
    code executable to configure communications to be supported by a second NFC RF technology for use during a data exchange phase of the communication link, wherein the second NFC RF technology is based on the second RF technology and mode value.

14. The non-transitory computer-readable medium of claim 13, further comprising:
    code executable to determine the start of the data exchange phase; and
    code executable to enable the communications supported using the second NFC RF technology.

15. The non-transitory computer-readable medium of claim 14, further comprising:
    code executable to obtain a data exchange phase transmit bit rate and a data exchange phase receive bit rate, and wherein the data exchange phase transmit bit rate and the data exchange phase receive bit rate are associated with the second RF technology and mode value and are used during the data exchange phase.

16. The non-transitory computer-readable medium of claim 13, wherein the remote NFC device includes one selected from among a remote NFC tag, a reader device, a writer device, a NFC card, and a remote peer target device.

17. The non-transitory computer-readable medium of claim 13, wherein the second NFC RF technology supports different data rate communications than the first NFC RF technology.

18. The non-transitory computer-readable medium of claim 13, wherein each of the first and second RF technologies includes one selected from among a NFC-A technology, a NFC-B technology, and a NFC-F technology.

19. The non-transitory computer-readable medium of claim 13, further comprising:
    code executable to estimate a time duration to transfer a data package of a first size based on a data rate associated with the second NFC RF technology.

20. The non-transitory computer-readable medium of claim 19, further comprising:
    code executable to prompt a user with an option to proceed with the data package transfer based on the estimated time duration; and
    code executable to receive a response from the user indicating whether to proceed with the data package transfer.

21. The non-transitory computer-readable medium of claim 20, further comprising:
    code executable to generate a RF activate notification message including the obtained values and parameters and send the RF activate notification message to a device host.

22. The non-transitory computer-readable medium of claim 13, wherein the communication link is on link among a Passive communication link and an Active communication link.

23. The non-transitory computer-readable medium of claim 22, further comprising:

code executable to estimate an available coverage range for the second NFC RF technology based on the communication link in use by the second NFC RF technology.

24. The non-transitory computer-readable medium of claim 23, further comprising:
code executable to prompt with a notification indicating a potential change in the communication link and a change in the estimated available coverage range associate with the change.

25. An apparatus for communication, comprising:
means for obtaining a first radio frequency (RF) technology and mode value, a second RF technology and mode value, and one or more RF specific parameters associated with a remote near field communication (NFC) device during an activation phase of a communication link using a first NFC RF technology, wherein the one or more RF specific parameters is based on the first RF technology and mode value; and
means for configuring communications to be supported by a second NFC RF technology for use during a data exchange phase of the communication link, wherein the second NFC RF technology is based on the second RF technology and mode value.

26. The apparatus of claim 25, wherein the means for configuring comprises:
means for determining the start of the data exchange phase; and
means for enabling the communications supported using the second NFC RF technology.

27. The apparatus of claim 26, wherein the means for obtaining further comprises means for obtaining a data exchange phase transmit bit rate and a data exchange phase receive bit rate, and wherein the data exchange phase transmit bit rate and the data exchange phase receive bit rate are associated with the second RF technology and mode value and are used during the data exchange phase.

28. The apparatus of claim 25, wherein the remote NFC device includes one selected from among a remote NFC tag, a reader device, a writer device, a NFC card, and a remote peer target device.

29. The apparatus of claim 25, wherein the second NFC RF technology supports different data rate communications than the first NFC RF technology.

30. The apparatus of claim 25, wherein each of the first and second RF technologies includes one selected from among a NFC-A technology, a NFC-B technology, and a NFC-F technology.

31. The apparatus of claim 25, furthering comprising:
means for estimating a time duration to transfer a data package of a first size based on a data rate associated with the second NFC RF technology.

32. The apparatus of claim 31, further comprising:
means for prompting a user with an option to proceed with the data package transfer based on the estimated time duration; and
means for receiving a response from the user indicating whether to proceed with the data package transfer.

33. The apparatus of claim 25, further comprising:
means for generating a RF activate notification message including the obtained values and parameters; and
means for sending the RF activate notification message to a device host.

34. The apparatus of claim 25, wherein the communication link is one link among a Passive communication link and an Active communication link.

35. The apparatus of claim 34, furthering comprising:
means for estimating an available coverage range for the second NFC RF technology based on the communication link in use by the second NFC RF technology.

36. The apparatus of claim 35, further comprising:
means for prompting with a notification indicating a potential change in the communication link and a change in the estimated available coverage range associate with the change.

37. An apparatus for communication, comprising:
a NFC controller configured to:
obtain a first radio frequency (RF) technology and mode value, a second RF technology and mode value, and one or more RF specific parameters associated with a remote near field communication (NFC) device during an activation phase of a communication link using a first NFC RF technology, wherein the one or more RF specific parameters is based on the first RF technology and mode value; and
configure communications to be supported by a second NFC RF technology for use during a data exchange phase of the communication link, wherein the second NFC RF technology is based on the second RF technology and mode value.

38. The apparatus of claim 37, wherein the NFC controller is configured to:
determine the start of the data exchange phase; and
enable the communications supported using the second NFC RF technology.

39. The apparatus of claim 38, wherein the NFC controller is further configured to obtain a data exchange phase transmit bit rate and a data exchange phase receive bit rate, and wherein the data exchange phase transmit bit rate and the data exchange phase receive bit rate are associated with the second RF technology and mode value and are used during the data exchange phase.

40. The apparatus of claim 37, wherein the remote NFC device includes one selected from among a remote NFC tag, a reader device, a writer device, a NFC card, and a remote peer target device.

41. The apparatus of claim 37, wherein the second NFC RF technology supports different data rate communications than the first NFC RF technology.

42. The apparatus of claim 37, wherein each of the first and second RF technologies includes one selected from among a NFC-A technology, a NFC-B technology, and a NFC-F technology.

43. The apparatus of claim 37, wherein the NFC controller is further configured to:
estimate a time duration to transfer a data package of a first size based on a data rate associated with the second NFC RF technology.

44. The apparatus of claim 43, wherein the NFC controller is further configured to:
prompt a user with an option to proceed with the data package transfer based on the estimated time duration; and
receive a response from the user indicating whether to proceed with the data package transfer.

45. The apparatus of claim 37, wherein the NFC controller is further configured to generate a RF activate notification message including the obtained values and parameters and send the RF activate notification message to a device host.

46. The apparatus of claim 37, wherein the communication link is one link among a Passive communication link and an Active communication link.

47. The apparatus of claim 46, wherein the NFC controller is further configured to:

estimate an available coverage range for the second NFC RF technology based on the communication link in use by the second NFC RF technology.

48. The apparatus of claim 47, further comprising a user interface configured to:
prompt with a notification indicating a potential change in the communication link and a change in the estimated available coverage range associate with the change.

* * * * *